Figure 1:
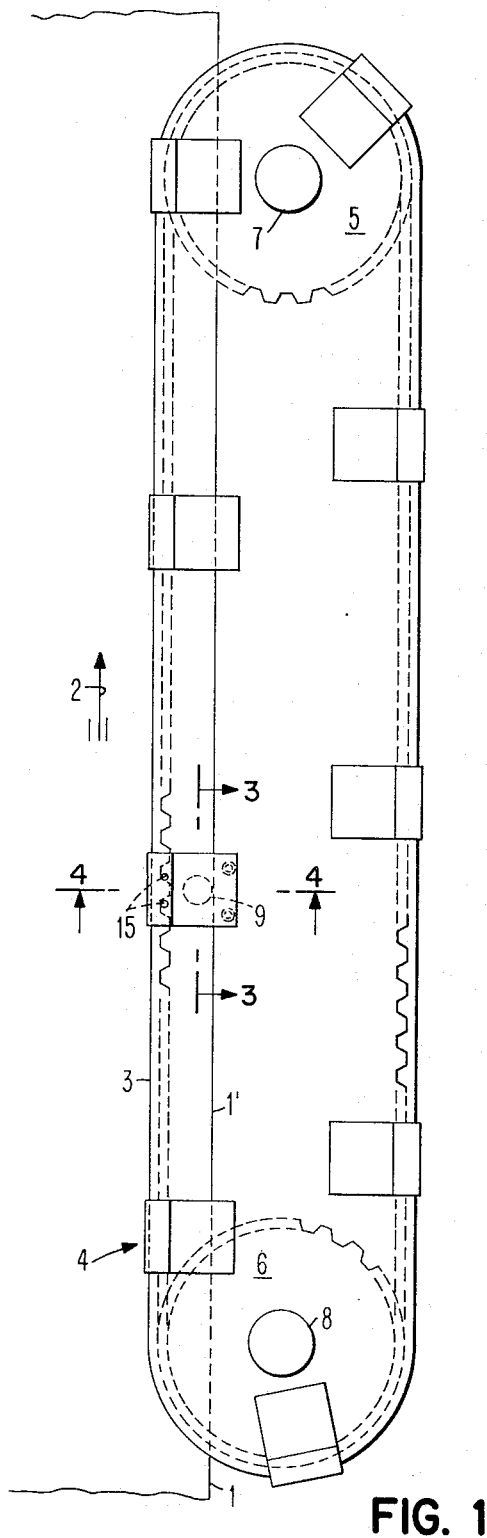

United States Patent [19]
Arnold

[11] 3,868,053
[45] Feb. 25, 1975

[54] TRANSPORT DEVICE FOR WEB MATERIAL

[75] Inventor: Sieghard Arnold, Hildrizhausen, Germany

[73] Assignee: International Business Machines Corporation, Armonk, N.Y.

[22] Filed: Oct. 15, 1973

[21] Appl. No.: 406,757

[30] Foreign Application Priority Data
Dec. 1, 1972 Germany............................ 2258802

[52] U.S. Cl. .............................................. 226/173
[51] Int. Cl............................................. B65h 17/34
[58] Field of Search ........... 226/170, 171, 172, 173, 226/165, 166; 198/133, 134, 179, 180

[56] References Cited
UNITED STATES PATENTS

| | | | |
|---|---|---|---|
| 3,580,451 | 5/1971 | Fraitzl............................... | 226/173 |
| 3,598,298 | 8/1971 | Diener............................... | 226/173 |

*Primary Examiner*—Richard A. Schacher
*Attorney, Agent, or Firm*—Francis V. Giolma

[57] ABSTRACT

For transporting a paper web an endless belt is provided running about spaced apart pulleys. Several ball or roll clamping devices are mounted on the belt to extend within the path of the belt so that the web gripping portions travel in a smaller path than the belt and hence on the curved end path about the pulleys they travel at a lower speed than the belt.

5 Claims, 4 Drawing Figures

TRANSPORT DEVICE FOR WEB MATERIAL

The invention relates to a transport device for web material, particularly for paper webs in high-speed printers of data processing systems, where an endless belt driven over rollers is used.

For transporting paper webs in printers of data processing systems it is generally known to use so-called tractors having an endless belt which is driven over rollers, and also having transport pins engaging in perforations in the margin of the paper web and taking it along. A particular disadvantage of these known tractors for transporting paper webs is that the loading of new paper webs into the transport device is quite circumstantial and time-consuming owing to the threading of the perforations into the transport pins of the endless belts. Furthermore, these transport devices do not permit the printing of the paper to the full margin. Besides, the perforated margin has in most cases to be removed after printing.

It is an object of the present invention to provide a transport device for web material of the above-specified type, particularly for transporting so-called endless paper webs in high-speed printers of data processing systems. No transport perforations are to be required in the paper, and the transport device is to operate without transport pins. Furthermore, the use of friction or transport rolls is to be avoided as they generally cause a considerable slip. The insertion of a new web into the transport device, the so-called loading, is to be of such a nature that it can be executed easily and without any problems and above all much quicker.

According to the invention, this object is achieved in that the axles of the rolls over which the endless belt is moving are substantially vertical to the web plane, and that on the belt ball or roll clamping devices operating in transport direction are provided and arranged in such a manner that the belt in its cycle travels a longer distance than the clamping points of the ball or roll clamping devices with the web.

In the device according to the invention, the ball or roll clamping devices move from the sides over the web, the ball or roll resting on one side of the web and the clamping plate opposite the ball resting on the other side of the web. Owing to the fact that the clamping point travels a shorter distance than the endless belt there are speed differences in the insertion and withdrawal zones of the web. Together with the surroundings of the ball, the clamping device is subjected to a shock-like acceleration in the insertion zone upon passing from the circular to the straight movement, so that the ball stays behind and clamps in the web. The surroundings of the ball are subjected to a shock-like deceleration in the withdrawal zone upon the passing from the straight to the circular movement around the transport roll, so that owing to its inertia the ball moves on with its former speed and the clamping action stops. It is thus ensured advantageously that in the insertion zone the ball automatically clamps in the web and releases it again automatically in the withdrawal zone.

The inventive device permits the uncomplicated and perfect transport of webs without perforations. It is, however, equally possible to transport paper with marginal perforations. The insertion of a new web is quite easy as the web has merely to be inserted between ball and clamping plate and aligned there, and as, with a vertical arrangement of the transport device, the clamping action is generated through the weight of the ball, or as in a horizontal arrangement the web can be clamped in after insertion by a jerky retraction. The device furthermore includes none, or very few, movable parts so that a simple and wear-resistant structure is possible. Furthermore, when the inventive device is used in printers of data processing systems, the web can be printed to its extreme margin.

Ball or roll clamping devices with a ball guided between an inclined supporting surface and a planar supporting surface, and where the material is clamped in between the planar supporting surface and the ball are known per se. German Gebrauchsmuster 7.149.557 for instance describes a clamping device for sheet-like material. The material is inserted from below between the ball and the planar supporting surface opposite thereto, and the clamping action is generated by the weight of the ball. In order to stop the clamping action in this known ball or roll clamping device with conical casing the counterplate of the ball has to be moved away from the ball. In the known device this is done manually. Apart from the fact that a manually stopped clamping action is not possible in a transport device for webs, particularly for the transport of paper webs in a high-speed printer the known clamping device is used only for arresting and not as follower or transport element in a transport device.

According to an advantageous embodiment of the transport device in accordance with the invention at least so many ball or roll clamping devices are arranged on the endless belt that at least one of these devices is in continuous transport engagement with the web. Thus, a continuous transport of the web is ensured. If a sufficient amount of ball or roll clamping devices is in simultaneous transport engagement with the web it is possible to transport said web with one single transport device.

According to another advantageous embodiment a toothed belt is used as belt which is driven and guided back by toothed pulleys. A particular advantage consists in a continuous operation of the transport device according to the invention.

In order to facilitate a simple and perfect entering and engaging of the ball or roll clamping device relative to the web the ball or roll clamping device is equipped with a clamping slot which opens funnel-like towards the web.

Structure and operation of the transport device according to the invention are explained in detail below on the basis of the embodiment shown in the drawings. The Figures represent the following:

FIG. 1 a plan view of the transport device according to the invention

Figure 2:
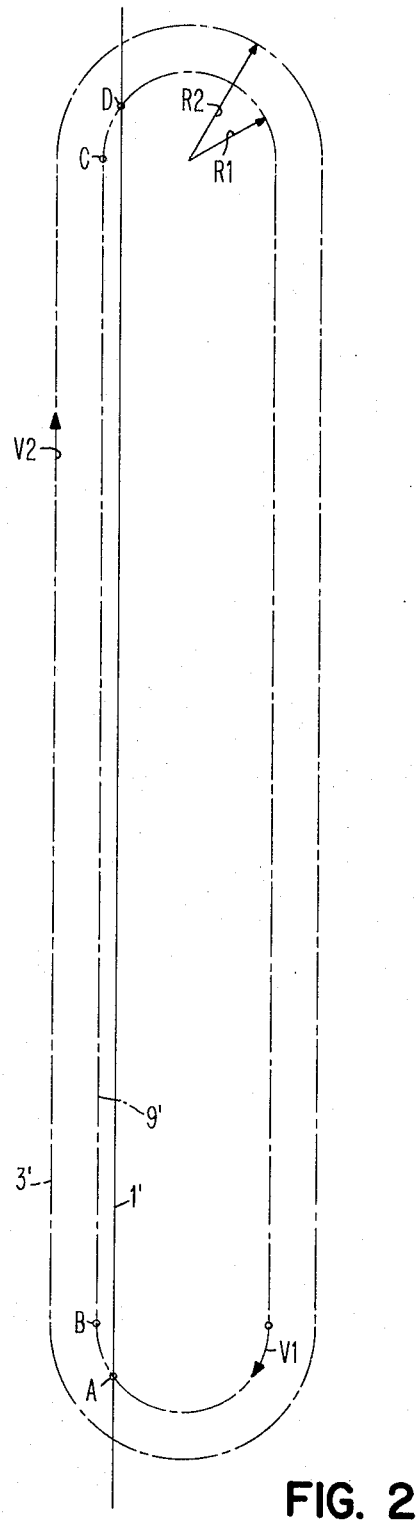
Figure 3:
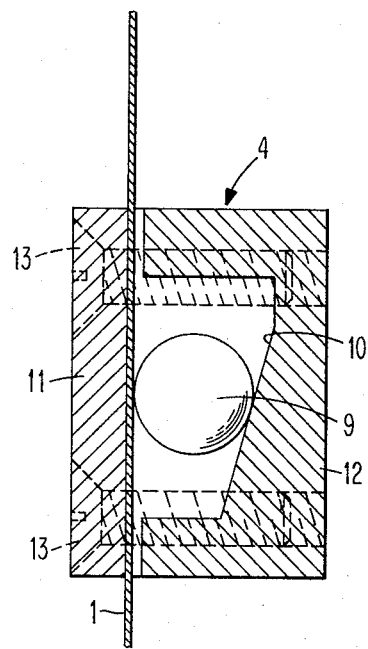

FIG. 2 schematically the paths and speed ratios of the transport belt and the clamping path FIG. 3 in an enlarged scale a sectional view through a clamping device along line 3—3 of FIG. 1

Figure 4:
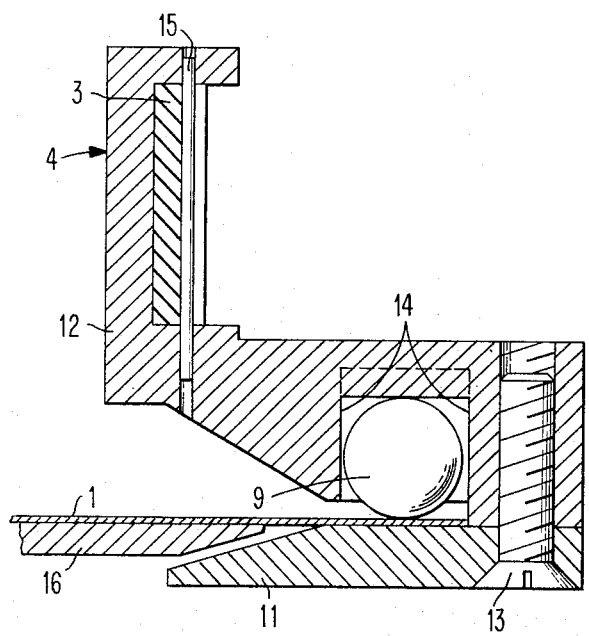

FIG. 4 in an enlarged scale another sectional view through a clamping device along line 4—4 of FIG. 1.

FIG. 1 shows the plan view of the device according to the invention. 1 marks a web to be transported, for instance a paper web which is to be transported in the direction of arrow 2. On a toothed belt 3, several ball or roll clamping devices 4 are firmly provided which circulate with belt 3. Belt 3 moves over two toothed pulleys 5 and 6, pulley 5 for example being driven by a driving motor (not shown), and pulley 6 serving as a deflection pulley. Axles 7 and 8 of pulleys 5 and 6 are vertical to the plane of paper web 1. The ball or roll clamping devices are fixed on the belt in such a manner that balls 9 travel upon a belt cycle a shorter distance than the belt itself, i.e. that the clamping point between a ball 9 and paper web 1 is closer to paper web margin 1' than belt 3.

FIG. 2 shows the paths covered by belt 3 and the clamping point between ball 9 and the paper during a cycle. In the Figure, 1' marks the margin of the paper web, 3' in the straight zone marks the neutral phase of belt 3 and in the curved zone the respective pitch circle of pulleys 5 and 6. 9' designates the path of the clamping point between ball 9 and paper web 1. The radius of path 9' of the clamping point in the deflection range of pulleys 5 and 6 is marked R1, and the radius of the pitch circle of the two pulleys is marked R2. The speed with which the ball revolves round pulleys 5 and 6 within the zone of the clamping point on the circular path is marked V1, and it is $R1 \cdot \pi \cdot n/30$, $n$ giving the number of revolutions per minute. The speed with which toothed belt 3 moves on path 3' is marked V2 and is $R2 \cdot \pi \cdot n/30$. During the straight movement between points B and C both speeds are equal but they differ in the insertion zone between points A and B and in the withdrawal zone between points C and D. In these zones, i.e. between the points where the ball reaches paper web margin 1', and the points prior to, or after the clamping the paper web 1 travels at a greater speed, i.e. V2. For the zone of the insertion of a ball clamping device 4 onto the paper web, i.e. the zone between A and B, this means that clamping device 4 itself moves in with speed V2, and ball 9 on the smaller radius R1 moves with the lower speed V1. As soon as point B is reached the speed for the entire clamping device, with the exception of ball 9, jumps to speed V2. As in that moment ball 9 itself still moves with speed V1 which is lower than V2 ball 9 lags back relative to its casing so that it clamps in paper web 1. At point C, the situation is reversed, i.e. there ball 9 has speed V2, and from point C onward the surroundings of ball 9 is subjected to a shock-like deceleration to speed V1 so that owing to its inertia ball 9 travels on with the higher speed V2 so that thus the clamping effect between ball 9 and paper web 1 is automatically stopped.

FIG. 3 shows a section through a ball clamping device 4 along line 3—3 in FIG. 1. Ball 9 moves between an inclined surface 10 and a counter-clamping plate 11 and it clamps paper web 1 between itself and counter-clamping plate 11. Counter-clamping plate 11 is fixed at a ball casing 12 by means of screws 13. FIG. 4 shows a sectional view through ball clamping device 4 along line 4—4 of FIG. 1. This shows that ball 9 is guided laterally between two parallel walls 14 of casing 12. Casing 12 of clamping device 4 encompasses toothed belt 3 from below, from outside, and from above and is fixed at the back to belt 3 by means of pins 15. Two pins 15 can be used there, in such a manner that they pass through borings of casing 12 and engage on both sides of a single tooth and hold the clamping device on belt 3, as shown in FIG. 1. FIG. 4 shows that paper web 1 is suitably guided in the area of the transport device on a support 16 which together with counter-clamping plate 11 forms an almost continuous planar support for paper web 1. Counter-clamping plate 11 and casing 12 of clamping device 4 form a funnel-like opening towards paper web 1, as shown by FIG. 4, so as to facilitate the entering of the clamping device round the paper web, as well as the withdrawal.

The device according to the invention advantageously permits the transport of unperforated webs by means of simple and automatically operating ball or roll clamping devices. The possible speeds can vary between 10 cm/sec and 2 m/sec approximately without any difficulties. The structure of the device according to the invention is uncomplicated and particularly wear-resistant as there are only few moving parts. Another important advantage consists in that it is insignificant whether the transport device operates vertically or horizontally. Furthermore, the insertion of a paper web is particularly easy as it merely has to be pushed into the first ball or roll clamping device, and as it is either clamped in automatically through the ball weight, or as, in a horizontal arrangement of the transport device, the clamping effect can be achieved upon insertion through a short jerky retraction of the web.

What is claimed is:

1. Transport device for web-like material, particularly for paper webs in high-speed printers of data processing systems, where an endless belt driven over pulleys is used, characterized in that the axles (7,8) of the pulleys (5,6) are substantially vertical to the plane of the web (1), and that on the belt (3) ball or roll clamping devices (4) acting in transport direction (2) are provided and arranged in such a manner that during its working cycle the belt (3) travels a greater distance (3') than the clamping points (9') of the ball or roll clamping devices (4) with the web (1).

2. Device as claimed in claim 1, characterized in that at least so many ball or roll clamping devices (4) are arranged on the belt (3) that at least one of them is continuously in transport engagement with the web (1) to be transported.

3. Device as claimed in one of claim 2, characterized in that the transport device operates continuously.

4. Device as claimed in claim 3, characterized in that the ball or roll clamping device (4) shows a clamping slot which opens in a funnel-like manner towards the web (1).

5. Device as claimed in claim 1, characterized in that toothed pulleys (5,6) are used as pulleys and a toothed belt (3) as a belt.

* * * * *